US012782676B2

(12) United States Patent
Ide

(10) Patent No.: US 12,782,676 B2
(45) Date of Patent: Nov. 3, 2026

(54) OPTICAL MODULE

(71) Applicant: HAMAMATSU PHOTONICS K.K., Hamamatsu (JP)

(72) Inventor: Tomoyuki Ide, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 393 days.

(21) Appl. No.: 18/211,667

(22) Filed: Jun. 20, 2023

(65) Prior Publication Data

US 2023/0418025 A1 Dec. 28, 2023

(30) Foreign Application Priority Data

Jun. 23, 2022 (JP) ................................ 2022-100882

(51) Int. Cl.
*G02B 7/198* (2021.01)

(52) U.S. Cl.
CPC .................................. *G02B 7/198* (2013.01)

(58) Field of Classification Search
CPC ..................................................... G02B 7/198
See application file for complete search history.

(56) References Cited

U.S. PATENT DOCUMENTS

2016/0197112 A1* 7/2016 Masuda .................. G02B 1/11 428/192
2017/0168349 A1* 6/2017 Sakai .................. G02B 5/3033
2020/0241289 A1* 7/2020 Morinaga .......... G02B 26/0833
2020/0310107 A1* 10/2020 Kojima ............... G02B 26/085

FOREIGN PATENT DOCUMENTS

JP 2002-372681 A 12/2002
JP 2013-508785 A 3/2013
JP 2019-035820 A 3/2019
WO WO-2011/051620 A2 5/2011

* cited by examiner

*Primary Examiner* — Edmond C Lau
(74) *Attorney, Agent, or Firm* — Faegre Drinker Biddle & Reath LLP

(57) ABSTRACT

An optical module includes a mirror unit, a magnet unit, and a package including a recess accommodating the magnet unit. The magnet unit includes a plurality of magnets arranged along a first direction. The recess includes a base wall portion which extends along the first direction and to which an upper surface of the magnet unit is fixed, and a side wall portion extending along a second direction intersecting the first direction, and facing a side surface of the magnet unit. The recess includes an opening portion that is delimited by the side wall portion and open to a lower side. The mirror unit is disposed on a second surface on an opposite side of the base wall portion from a first surface to which the magnet unit is fixed. The side wall portion protrudes to the lower side with respect to a bottom surface of the magnet unit.

19 Claims, 7 Drawing Sheets

OPTICAL MODULE

TECHNICAL FIELD

One aspect of the present disclosure relates to an optical module.

BACKGROUND

Japanese Unexamined Patent Publication No. 2013-508785 describes an optical module in which a mirror device including a movable mirror portion is disposed on a magnet unit. In the optical module, the magnet unit includes three magnets arranged along a lateral direction. The three magnets have magnetic directions different from each other. The mirror device is disposed across the three magnets.

SUMMARY

Technical Problem

The magnet unit as described above is formed by integrating the three magnets through bonding; however, since the magnets repel each other, the position of the magnet unit may deviate in an up-down direction, and step portions may be formed on an upper surface and a bottom surface of the magnet unit. When the mirror device is disposed on the upper surface of the magnet unit on which the step portion is formed, the inclination of the mirror device deviates from a target angle, which is a concern. From the viewpoint of reliability, the optical module requires suppressing such a deviation in the inclination of the mirror device.

An object of one aspect of the present disclosure is to provide an optical module capable of enhancing reliability.

Solution to Problem

[1] According to one aspect of the present disclosure, there is provided "an optical module including: a mirror unit including a mirror device including a movable mirror portion provided with a coil; a magnet unit having an upper surface, a bottom surface, and a side surface extending from the upper surface to the bottom surface, and generating a magnetic field acting on the movable mirror portion; and a package including a recess accommodating the magnet unit. The magnet unit includes a plurality of magnets arranged along a first direction. The recess includes a base wall portion which extends along the first direction and to which the upper surface of the magnet unit is fixed, and a side wall portion extending along a second direction intersecting the first direction, and facing the side surface of the magnet unit. When a side on which the magnet unit is located with respect to the base wall portion in the second direction is defined as a lower side, the recess includes an opening portion that is delimited by the side wall portion and open to the lower side. The mirror unit is disposed on a second surface on an opposite side of the base wall portion from a first surface to which the magnet unit is fixed. The side wall portion protrudes to the lower side with respect to the bottom surface of the magnet unit."

In the optical module, the magnet unit is accommodated in the recess of the package, the magnet unit is fixed to the first surface of the base wall portion delimiting the recess, and the mirror unit is disposed on the second surface on the opposite side of the base wall portion from the first surface. Accordingly, even when a step portion is formed on the upper surface of the magnet unit, a deviation in the inclination of the mirror unit due to the influence of the step portion can be suppressed. In addition, the recess includes the opening portion that is delimited by the side wall portion and open to the lower side. Accordingly, the magnet unit can be disposed into the recess from the opening portion, and a structure can be realized in which the bottom surface of the magnet unit does not come into contact with the package. Also with this configuration, a deviation in the inclination of the mirror unit due to the influence of the step portion formed on the magnet unit can be suppressed. Namely, for example, in the case of a structure in which the magnet unit is embedded in the package by insert molding, unevenness occurs on a surface of the package due to the influence of the step portion on the upper surface or the bottom surface of the magnet unit, and the unevenness causes a deviation in the inclination of the mirror unit, which is a concern; however, in the optical module, the occurrence of such a situation can be suppressed. Further, the side wall portion delimiting the recess protrudes to the lower side with respect to the bottom surface of the magnet unit. Accordingly, the magnet unit can be reliably accommodated in the package, and damage to the magnet unit and the like can be suppressed. In addition, for example, when the optical module is disposed on an installation surface, by bringing the side wall portion into contact with the installation surface, instead of the bottom surface of the magnet unit on which the step portion can be formed, the optical module can be accurately disposed. Therefore, according to the optical module, reliability can be enhanced.

[2] In the optical module according to one aspect of the present disclosure described in [1], "the upper surface of the magnet unit may be fixed to the base wall portion by an adhesive material, and a gap may be formed between the magnet unit and the side wall portion." In this case, when the magnet unit is fixed to the base wall portion by the adhesive material, the adhesive material can be released into the gap. For this reason, during the adhesion, the magnet unit can be brought closer to the base wall portion, so that the magnet unit can be brought closer to the mirror unit.

[3] In the optical module according to one aspect of the present disclosure described in [2], "when viewed in the second direction, the gap may include a first portion extending along one direction, and a second portion extending along a direction intersecting an extending direction of the first portion." In this case, the operational effect of being able to release the adhesive material described above into the gap is remarkably achieved.

[4] In the optical module according to one aspect of the present disclosure described in [2] or [3], "the side wall portion may include a first side wall portion and a second side wall portion facing the first side wall portion. The gap may be formed between the magnet unit and the first side wall portion. A thickness of the second side wall portion may be thicker than a thickness of the first side wall portion." In this case, while forming the gap for the release of the adhesive material, a center of the magnet unit can be disposed at a position close to a center of the package when viewed in the second direction. In addition, in the optical module according to one aspect of the present disclosure described in [4], "the side wall portion may further include a third side wall portion extending to intersect the first side wall portion, and a fourth side wall portion facing the third side wall portion. The gap may be formed between the magnet unit and the third side wall portion. A thickness of the fourth side wall portion may be thicker than a thickness of the third side wall portion." In this case as well, while forming the gap for the release of the adhesive material, the center of the magnet unit can be disposed at the position close to the center of the package when viewed in the second direction.

[5] In the optical module according to one aspect of the present disclosure described in any one of [1] to [4], "the magnet unit may include two side portions forming one corner when viewed in the second direction, and at least one of the two side portions may be separated from the side wall portion." In this case, damage to the one corner can be suppressed. In addition, in the optical module according to one aspect of the present disclosure described in any one of [1] to [5], "the magnet unit may include four corners when viewed in the second direction, and regarding each of the four corners, at least one of two side portions forming the corner may be separated from the side wall portion." In this case, damage to the corner of the magnet unit can be suppressed.

[6] In the optical module according to one aspect of the present disclosure described in any one of [1] to [5], "a groove portion extending along the second direction may be formed in the side wall portion at a position corresponding to a corner of the magnet unit." In this case, damage to the corner of the magnet unit can be suppressed, and the positioning of the magnet unit with respect to the side wall portion can be facilitated.

[7] In the optical module according to one aspect of the present disclosure described in any one of [1] to [6], "the mirror unit may be fixed to the second surface of the base wall portion by an adhesive material, and a fillet may be formed at a boundary portion between a side surface of the mirror unit and the second surface of the base wall portion by the adhesive material." In this case, the mirror unit can be firmly fixed to the base wall portion.

[8] In the optical module according to one aspect of the present disclosure described in any one of [1] to [7], "the mirror unit may be fixed to the second surface of the base wall portion by an adhesive material, and a thickness of the adhesive material between the mirror unit and the second surface of the base wall portion may be 10 μm to 30 μm." For example, by using the adhesive material with low viscosity, the adhesive material can be formed with such a thickness. By using the adhesive material with low viscosity, a deviation in the inclination of the mirror unit can be further suppressed.

[9] In the optical module according to one aspect of the present disclosure described in any one of [1] to [8], "the plurality of magnets may be arranged in a Halbach array." In this case, the magnetic flux density in the vicinity of the movable mirror portion can be increased.

[10] The optical module according to one aspect of the present disclosure described in any one of [1] to [9] "may further include a wire for electrically connecting the mirror unit to an outside. The mirror unit may be fixed to the second surface of the base wall portion in a predetermined adhesive region by an adhesive material. The wire may be connected to the mirror unit at a position overlapping the adhesive region when viewed in the second direction." In this case, damage to the mirror unit when the wire is connected can be suppressed. In addition, the wire can be satisfactorily connected to the mirror unit.

[11] In the optical module according to one aspect of the present disclosure described in any one of [1] to [10], "a region where the mirror unit is disposed on the second surface of the base wall portion may be formed flat." In this case, the strength of the package can be ensured, and the deformation of the package can be suppressed. In addition, since the mirror unit is disposed in the flat region, a deviation in the inclination of the mirror unit can be further suppressed.

[12] In the optical module according to the optical module of one aspect of the present disclosure described in any one of [1] to [11], "when viewed in the second direction, an outer edge of the mirror unit may be located inside an outer edge of the magnet unit." In this case, a uniform magnetic force can act on the movable mirror portion. In addition, in this case, since a region where the magnetic force is uniform is widened, even when the mounting position of the mirror unit deviates from a target position, characteristics of the mirror unit are less likely to be affected.

[13] In the optical module according to the optical module of one aspect of the present disclosure described in any one of [1] to [12], "the plurality of magnets may include a first magnet and a second magnet, and a step portion may be formed on at least one of the upper surface and the bottom surface of the magnet unit due to a positional difference in the second direction between a surface of the first magnet and a surface of the second magnet." In this case as well, according to the optical module, reliability can be enhanced for the above-described reasons.

According to one aspect of the present disclosure, it is possible to provide the optical module capable of enhancing reliability.

DETAILED DESCRIPTION

Hereinafter, an embodiment of the present disclosure will be described in detail with reference to the drawings. In the following description, the same reference signs are used to denote the same or equivalent elements, and duplicate descriptions will be omitted.

[Optical Module]

Figure 1:
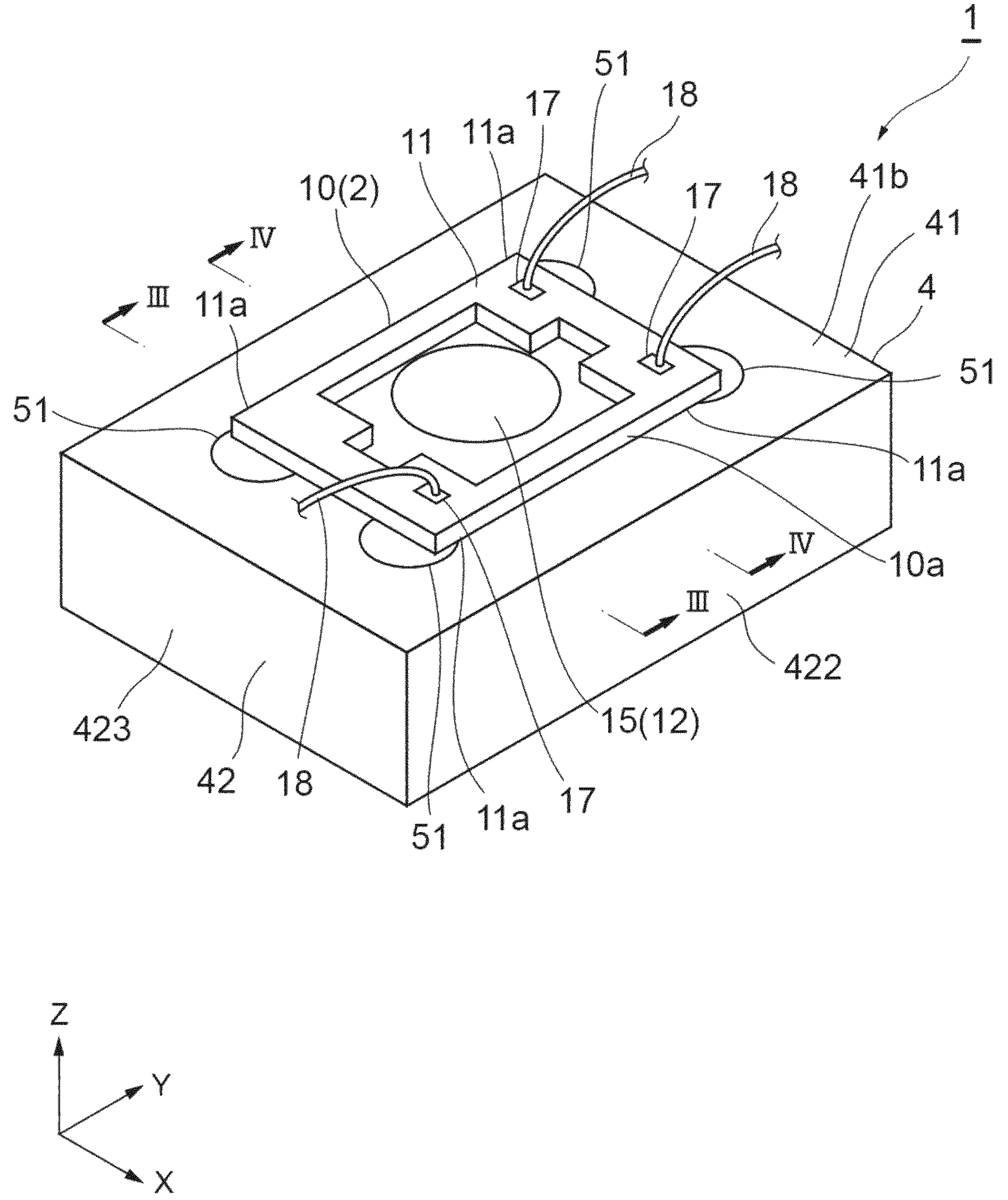
FIG. 1 is a perspective view showing an optical module according to an embodiment.
Figure 2:
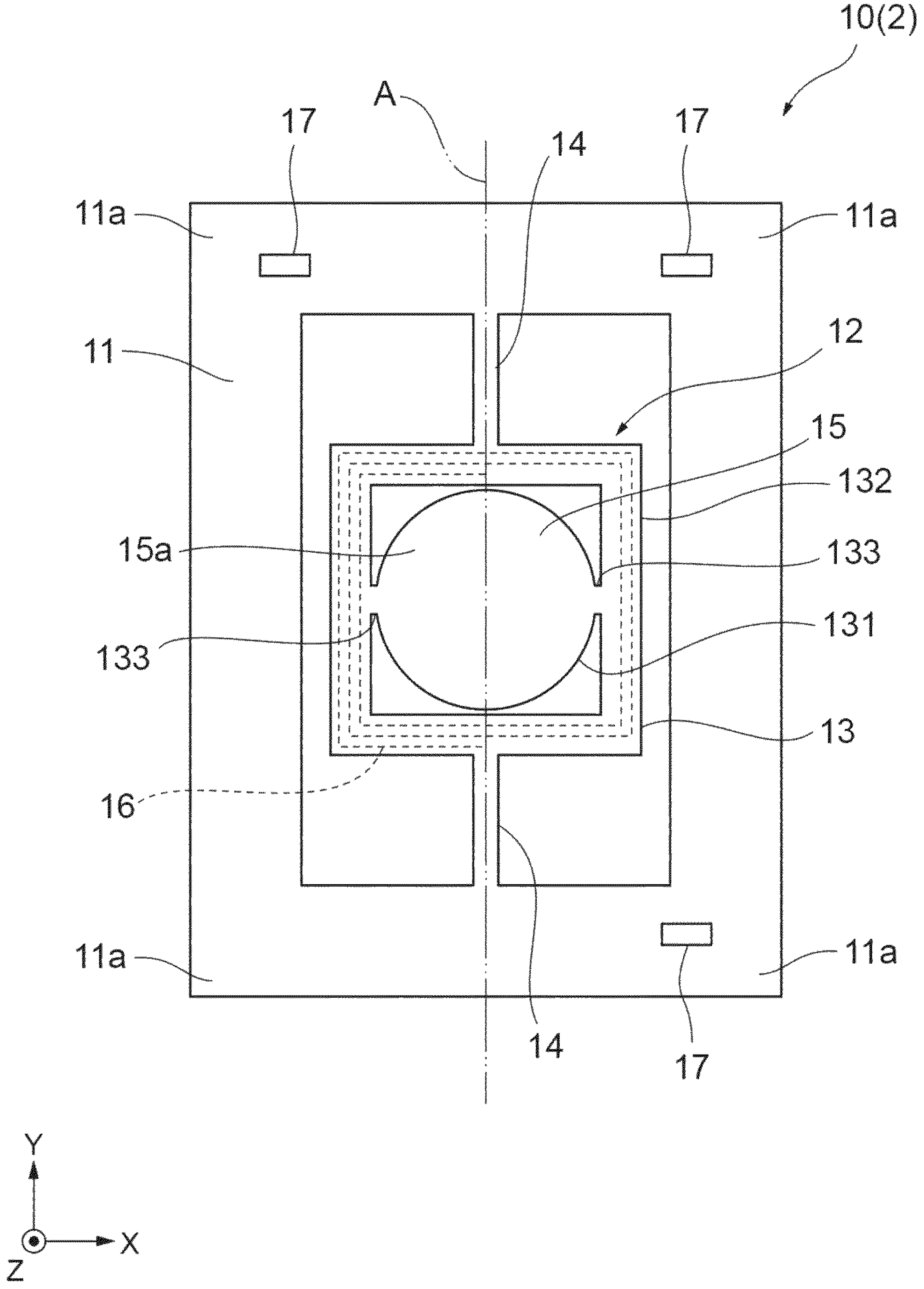
FIG. 2 is a plan view of a mirror device.

As shown in FIGS. 1 to 4, an optical module 1 includes a mirror unit 2, a magnet unit 3, and a package 4. The mirror unit 2 and the magnet unit 3 are fixed to the package 4. First, the mirror unit 2 will be described with reference to FIG. 2. In this example, the mirror unit 2 is formed of only a mirror device 10, but as will be described later, may further include a base member to which the mirror device 10 is fixed. Hereinafter, as shown in each drawing, an X direction (first direction), a Y direction (third direction), and a Z direction (second direction) will be set and described. The X direction, the Y direction, and the Z direction are directions perpendicular to each other. In FIG. 1, the mirror device is shown in a simplified manner.

[Mirror Device (Mirror Unit)]

The mirror device 10 includes a support portion 11 and a movable mirror portion 12 that is oscillatable with respect to the support portion 11. The movable mirror portion 12 includes a movable portion 13, a pair of connection portions 14, and a mirror 15. The support portion 11, the movable portion 13, and the pair of connection portions 14 are integrally formed by, for example, a silicon on insulator (SOI) substrate. Namely, the mirror device 10 is a micro-electromechanical systems (MEMS) device formed using a semiconductor material.

The support portion 11 is formed in, for example, a rectangular frame shape. The movable portion 13 is formed in, for example, a rectangular plate shape, and is disposed inside the support portion 11 when viewed in an optical axis direction (surrounded by the support portion 11). The optical axis direction is a direction perpendicular to a plane on which the support portion 11 and the movable mirror portion 12 are disposed, and is a direction perpendicular to the mirror 15 in this example. In this example, the optical axis direction is parallel to the Z direction. The movable portion 13 is connected to the support portion 11 by the pair of connection portions 14 so as to be oscillatable around an axis A. In this example, the axis A is parallel to the Y direction.

The movable portion 13 includes a first portion 131 and a second portion 132. The first portion 131 is formed in, for example, a circular shape when viewed in the optical axis direction. The second portion 132 is formed in, for example, a rectangular annular shape when viewed in the optical axis direction. The first portion 131 is disposed inside the second portion 132 when viewed in the optical axis direction (surrounded by the second portion 132), and is connected to the second portion 132 by a plurality (two in this example) of connecting portions 133. A gap is formed between the first portion 131 and the second portion 132 except for the plurality of connecting portions 133. The connecting portions 133 are, for example, located at central portions of two sides of a rectangular inner edge of the second portion 132, the two sides being parallel to the axis A.

The pair of connection portions 14 are disposed on the axis A in the gap between the support portion 11 and the movable portion 13 so as to sandwich the movable portion 13 therebetween. In this example, each of the connection portions 14 is formed in a rectangular plate shape, and extends along the axis A. Each of the connection portions 14 functions as a torsion bar.

The mirror 15 is provided on the first portion 131 of the movable portion 13. The mirror 15 is formed on a surface on one side in the optical axis direction of the first portion 131. The mirror 15 is, for example, formed in a circular, elliptical, or rectangular film shape from a metal material such as aluminum, aluminum-based alloy, gold, or silver. A surface on an opposite side of the mirror 15 from the movable portion 13 forms a mirror surface 15*a* extending perpendicular to the optical axis direction. A center of the mirror 15 coincides with a center of the first portion 131 (center of the mirror device 10) when viewed in the optical axis direction. In the mirror device 10, since the mirror 15 is provided on the first portion 131 connected to the second portion 132 via the plurality of connecting portions 133, even when the movable portion 13 oscillates around the axis A at a resonant frequency level, the occurrence of deformation such as bending in the mirror 15 can be suppressed.

Further, the mirror device 10 includes a coil 16 and a plurality (three in this example) of electrode pads 17. The coil 16 is provided in the second portion 132 of the movable portion 13. The coil 16 is wound multiple times in a spiral shape in a region (namely, the second portion 132) outside the mirror 15 when viewed in the optical axis direction. A magnetic field generated by the magnet unit 3 acts on the coil 16.

The coil 16 is made of, for example, a metal material such as copper, and is disposed in a groove formed in a surface of the movable portion 13. Namely, the coil 16 is embedded in the movable portion 13. One end of the coil 16 is connected to one electrode pad 17 via a wiring (not shown), and the other end of the coil 16 is connected to the other electrode pads 17 via wirings (not shown). Each of the electrode pads 17 is connected to a wire 18 for electrically connecting the mirror device to the outside. One end of the wire 18 is connected to the electrode pad 17, and the other end of the wire 18 is connected to an external device (for example, a power supply device or the like). The remaining electrode pads 17 are electrically connected to other electrical elements included in the mirror device 10.

An example of a method for driving the mirror device 10 will be described. As one example, a drive current of a high frequency is applied to the coil 16. At this time, since the magnetic field generated by the magnet unit 3 acts on the coil 16, a Lorentz force is generated in the coil 16. Accordingly, for example, the movable portion 13 is oscillated around the axis A at the resonant frequency level. Scanning can be performed with light from a predetermined light source by causing the mirror 15 (mirror surface 15*a*) to reflect the light through driving the mirror device 10 in such a manner. As another example, a drive current of a constant magnitude may be applied to the coil 16. In this case, the movable portion 13 rotates around the axis A according to the magnitude of the drive current, and stops at a predetermined rotation angle. In such a manner, the movable portion 13 may be statically driven (linear drive).

[Magnet Unit]

The magnet unit 3 will be described with reference to FIGS. 1, 3, and 4. The magnet unit 3 generates a magnetic field acting on the movable mirror portion 12 (coil 16). The magnet unit 3 is disposed inside a recess 40 formed in the package 4. Hereinafter, a side on which the magnet unit 3 is located with respect to a base wall portion 41 of the package 4 to be described later will be described as a "lower side", and a side opposite to the lower side (side on which the base wall portion 41 is located with respect to the magnet unit 3) will be described as an "upper side". The "upper side" and the "lower side" coincide with a lower side and an upper side in FIGS. 1, 3, 4, respectively. The "upper side" and the "lower side" are set for the convenience of description, and do not limit usage modes of the optical module 1. For example, the optical module 1 may be used in a state where the set "upper side" faces the vertically lower side, or may be used in a state where the set "upper side" faces a horizontal direction.

The magnet unit 3 has an upper surface 3*a*; a bottom surface 3*b* opposite to the upper surface 3*a*; and a side surface 3*s* extending from the upper surface 3*a* to the bottom surface 3*b* and connected to the upper surface 3*a* and the bottom surface 3*b*. The magnet unit 3 is formed in, for example, a substantially rectangular parallelepiped shape. Therefore, in this example, the upper surface 3*a* and the bottom surface 3*b* extend substantially parallel to each other, and the side surface 3*s* includes four surfaces disposed in a quadrangular annular shape.

The magnet unit 3 includes a plurality of magnets arranged along the X direction (first direction). In this example, the magnet unit 3 includes a first magnet 31 (central magnet), and a second magnet 32 and a third magnet 33 disposed to sandwich the first magnet 31 therebetween.

Namely, the third magnet 33 is disposed opposite to the second magnet 32 with respect to the first magnet 31 in the X direction. The first magnet 31 is adhered to the second magnet 32 and the third magnet 33, and the first magnet 31, the second magnet 32, and the third magnet 33 are integrated. The first magnet 31, the second magnet 32, and the third magnet 33 are not limited to being integrated by adhesion, and may be integrated by plasma bonding, thermal bonding, or the like or may be integrated by insert molding using a resin material. As described above, the magnet unit 3 is disposed inside the recess 40 of the package 4. The first magnet 31, the second magnet 32, and the third magnet 33 may be disposed inside the recess 40 after being integrated. Alternatively, the first magnet 31, the second magnet 32, and the third magnet 33 may be disposed in order inside the recess 40 before being integrated, and the first magnet 31, the second magnet 32, and the third magnet 33 may be integrated inside the recess 40.

Each of the first magnet 31, the second magnet 32, and the third magnet 33 is a permanent magnet formed in a rectangular parallelepiped shape. A width W1 of the first magnet 31 in the X direction is wider than a width W2 of the second magnet 32 in the X direction and a width W3 of the third magnet 33 in the X direction. In this example, the width W2 is equal to the width W3. In this example, a length of the first magnet 31 in the Z direction (second direction) is longer than a length of the second magnet 32 and a length of the third magnet 33 in the Z direction. The Z direction (second direction) is a direction perpendicular to the X direction (first direction). The "upper side" and the "lower side" described above are one side and the other side in the Z direction, respectively. Incidentally, in the present specification, a length (width or thickness) of an element B in a direction A means a maximum length (maximum width or maximum thickness) of the element B in the direction A.

The first magnet 31 has a first upper surface 31*a* and a first bottom surface 31*b*, the second magnet 32 has a second upper surface 32*a* and a second bottom surface 32*b*, and the third magnet 33 has a third upper surface 33*a* and a third bottom surface 33*b*. The first upper surface 31*a*, the second upper surface 32*a*, and the third upper surface 33*a* are surfaces on the upper side of the first magnet 31, the second magnet 32, and the third magnet 33, respectively, and the first bottom surface 31*b*, the second bottom surface 32*b*, and the third bottom surface 33*b* are surfaces on the lower side of the first magnet 31, the second magnet 32, and the third magnet 33, respectively. The first upper surface 31*a*, the second upper surface 32*a*, and the third upper surface 33*a* form the upper surface 3*a* of the magnet unit 3 that is a surface on the upper side, and the first bottom surface 31*b*, the second bottom surface 32*b*, and the third bottom surface 33*b* form the bottom surface 3*b* of the magnet unit 3 that is a surface on the lower side. In this example, each of the first upper surface 31*a*, the second upper surface 32*a*, the third upper surface 33*a*, the first bottom surface 31*b*, the second bottom surface 32*b*, and the third bottom surface 33*b* is a flat surface perpendicular to the Z direction.

Step portions 35 are formed on the upper surface 3*a* of the magnet unit 3. Specifically, the first upper surface 31*a* of the first magnet 31 is located closer to the upper side than the second upper surface 32*a* of the second magnet 32 and the third upper surface 33*a* of the third magnet 33 (protrudes to the upper side with respect to the second upper surface 32*a* and the third upper surface 33*a*). Namely, the second upper surface 32*a* and the third upper surface 33*a* are located closer to the lower side than the first upper surface 31*a*. Accordingly, the step portions 35 are each formed between the first upper surface 31*a* and the second upper surface 32*a* and between the first upper surface 31*a* and the third upper surface 33*a*. Namely, the step portions 35 are formed due to positional differences in the Z direction between the first upper surface 31*a* and both the second upper surface 32*a* and the third upper surface 33*a*. In this example, the second upper surface 32*a* and the third upper surface 33*a* are located on the same plane.

Step portions 36 are formed on the bottom surface 3*b* of the magnet unit 3. Specifically, the first bottom surface 31*b* of the first magnet 31 is located closer to the lower side than the second bottom surface 32*b* of the second magnet 32 and the third bottom surface 33*b* of the third magnet 33 (protrudes to the lower side with respect to the second bottom surface 32*b* and the third bottom surface 33*b*). Namely, the second bottom surface 32*b* and the third bottom surface 33*b* are located closer to the upper side than the first bottom surface 31*b*. Accordingly, the step portions 36 are each formed between the first bottom surface 31*b* and the second bottom surface 32*b* and between the first bottom surface 31*b* and the third bottom surface 33*b*. Namely, the step portions 36 are formed due to positional differences in the Z direction between the first bottom surface 31*b* and both the second bottom surface 32*b* and the third bottom surface 33*b*. In this example, the second bottom surface 32*b* and the third bottom surface 33*b* are located on the same plane.

The first magnet 31, the second magnet 32, and the third magnet 33 are arranged in a Halbach array. Namely, the first magnet 31, the second magnet 32, and the third magnet 33 are arranged such that two magnetic poles included in each magnet are arranged in a Halbach array. More specifically, for example, the second magnet 32 is disposed such that a first magnetic pole (for example, N pole) thereof is located on a bottom surface 3*b* side (second bottom surface 32*b* side) and a second magnetic pole (for example, S pole) thereof is located on an upper surface 3*a* side (second upper surface 32*a* side). The third magnet 33 is disposed such that the magnetic poles are arranged in a direction opposite to that of the second magnet 32. Namely, the third magnet 33 is disposed such that a first magnetic pole thereof is located on the upper surface 3*a* side (third upper surface 33*a* side) and a second magnetic pole thereof is located on the bottom surface 3*b* side (third bottom surface 33*b* side). On the other hand, the first magnet 31 is disposed such that a first magnetic pole is located on a third magnet 33 side and a second magnetic pole is located on a second magnet 32 side. In such a manner, the first magnet 31 has the magnetic poles arranged along the X direction, and the second magnet 32 and the third magnet 33 have the magnetic poles arranged along the Z direction. In other words, the first magnet 31 is magnetized in the X direction, and the second magnet 32 and the third magnet 33 are magnetized in the Z direction. In FIGS. 3 and 4, directions from the first magnets 31 toward the second magnets 32 in the first magnet 31, the second magnet 32, and the third magnet 33 are indicated by arrows.

[Package]

The package 4 will be described with reference to FIGS. 1 and 3 to 5. The package 4 is made of, for example, a resin material, and includes the recess 40 that accommodates the magnet unit 3. The recess is delimited by the base wall portion 41 and a side wall portion 42, and is formed in a substantially rectangular parallelepiped shape. The magnet unit 3 is fixed to a first surface 41*a* of the base wall portion 41, and the mirror device 10 is fixed to a second surface 41*b* of the base wall portion 41. The magnet unit 3 is located on the lower side with respect to the base wall portion 41 in the Z direction, and the mirror device 10 is located on the upper side with respect to the base wall portion 41 in the Z direction.

The base wall portion 41 is formed in, for example, a rectangular plate shape, and extends along the X direction (to intersect the Z direction). The base wall portion 41 has the first surface 41*a* and the second surface 41*b* opposite to the first surface 41*a*. The first surface 41*a* is a surface facing the lower side, and delimits the recess 40 inside the package 4. The second surface 41*b* is a surface facing the upper side, and is exposed to the outside of the package 4. In this example, the first surface 41*a* and the second surface 41*b* are flat surfaces having a rectangular shape and parallel to each other.

The mirror device 10 is fixed to the second surface 41*b* of the base wall portion 41. In this example, the mirror device 10 is fixed to the second surface 41*b* on the support portion 11 by an adhesive material 51 (second adhesive material). More specifically, the mirror device 10 is fixed to the second surface 41*b* in a predetermined adhesive region R. In this example, the adhesive region R is set to overlap four corner portions 11*a* of the support portion 11 (mirror device 10) when viewed in the Z direction. Namely, in this example, the mirror device 10 is adhered to the second surface 41*b* at the four corner portions 11*a* of the support portion 11, and is not adhered to the second surface 41*b* at portions other than the four corner portions 11*a*. As described above, in this example, the entirety of the second surface 41*b* is formed flat. Therefore, a region where the mirror device 10 is disposed on the second surface 41*b* (region overlapping the mirror device 10 in the Z direction) is formed flat. The position of the adhesive region R is not limited to a position overlapping the four corner portions 11*a* of the support portion 11 when viewed in the Z direction, and may be set at any position.

As described above, a plurality (three in this example) of the wires 18 are connected to the mirror device 10. Each of the wires 18 is connected to the mirror device 10 (electrode pad 17) at a position overlapping the adhesive region R when viewed in the Z direction. In other words, the electrode pads 17 are provided on the mirror device 10 at the positions overlapping the adhesive region R when viewed in the Z direction.

Figure 3:
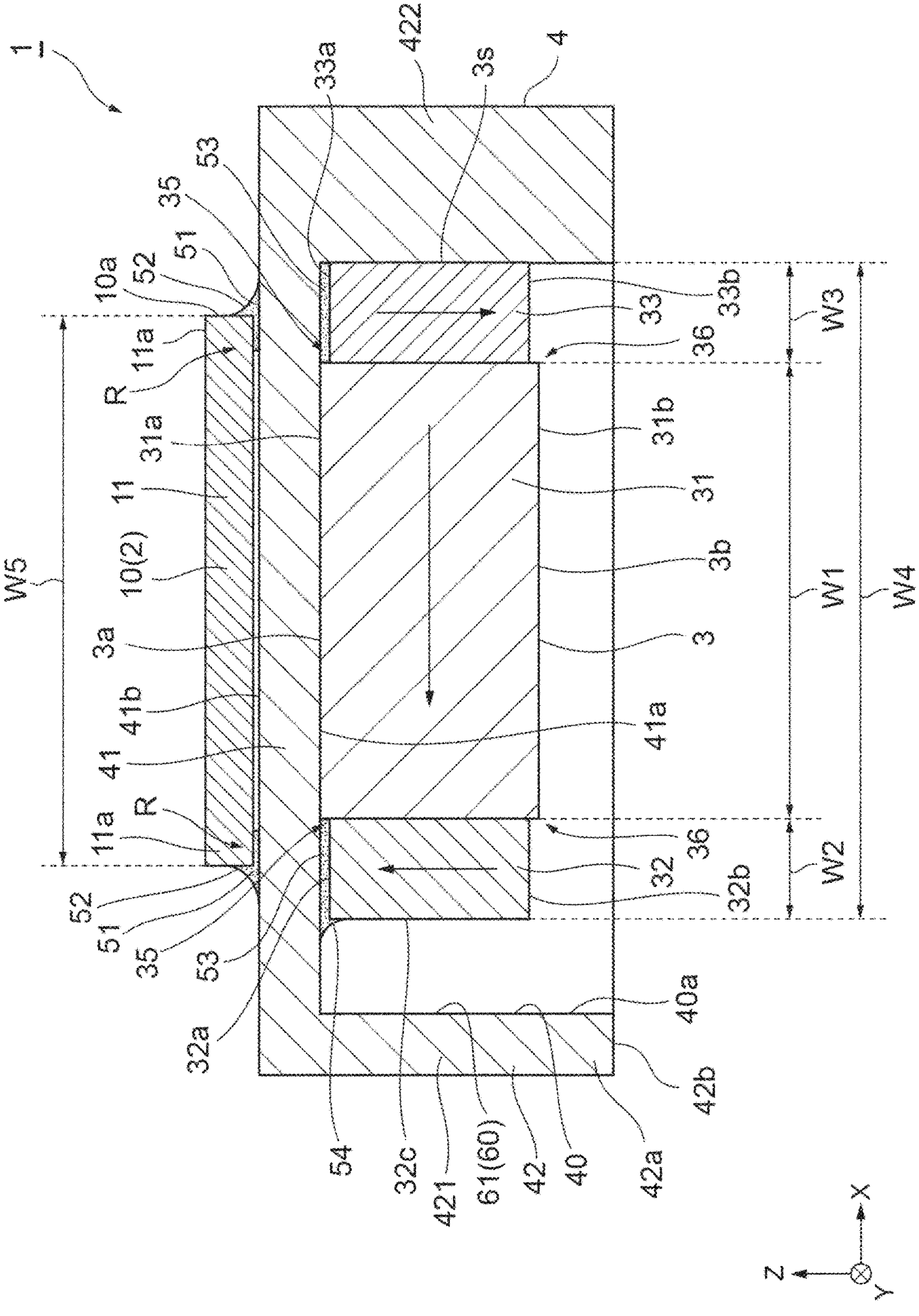
FIG. 3 is a cross-sectional view taken along line III-III of FIG. 1.

As shown in FIG. 3, a fillet 52 (second fillet) is formed at a boundary portion between a side surface 10*a* of the mirror device 10 (side surface of the support portion 11) and the second surface 41*b* by the adhesive material 51. The fillet 52 is formed by the adhesive material 51 protruding from between the mirror device 10 and the second surface 41*b* to the outside during the adhesion of the mirror device 10. A thickness of the adhesive material 51 between the mirror device 10 and the second surface 41*b* is 10 μm to 30 μm. For example, by using the adhesive material 51 with low viscosity, the adhesive material 51 can be formed with such a thickness. Examples of the adhesive material 51 include Ag paste, adhesive materials made of silicone-based, epoxy-based, or acrylate-based materials, and the like. The fillet 52 may be formed at least at the boundary portion between the side surface 10*a* of the mirror device 10 and the second surface 41*b*, or may be formed, for example, to come into contact with the entirety of the side surface 10*a* in the Z direction.

The magnet unit 3 accommodated in the recess 40 is fixed to the first surface 41*a* of the base wall portion 41. In this example, the magnet unit 3 is fixed to the first surface 41*a* via the upper surface 3*a* by an adhesive material 53 (first adhesive material). In this example, the adhesive material 53 is disposed between the entirety of the upper surface 3*a* and the first surface 41*a*. Namely, the adhesive material 53 is disposed between the first surface 41*a* and each of the first upper surface 31*a* of the first magnet 31, the second upper surface 32*a* of the second magnet 32, and the third upper surface 33*a* of the third magnet 33. As described above, in this example, the first upper surface 31*a* is located closer to the upper side than the second upper surface 32*a* and the third upper surface 33*a*. In other words, the second upper surface 32*a* and the third upper surface 33*a* are located closer to the lower side than the first upper surface 31*a*. Therefore, a gap with a larger thickness in the Z direction is formed between the first surface 41*a* and each of the second upper surface 32*a* and the third upper surface 33*a* than between the first upper surface 31*a* and the first surface 41*a*. In this example, the adhesive material 53 is disposed (filled) in the entirety of the gap. As a result, a larger amount of the adhesive material 53 is disposed between the first surface 41*a* and each of the second upper surface 32*a* and third upper surface 33*a* than between the first upper surface 31*a* and the first surface 41*a*.

Figure 4:
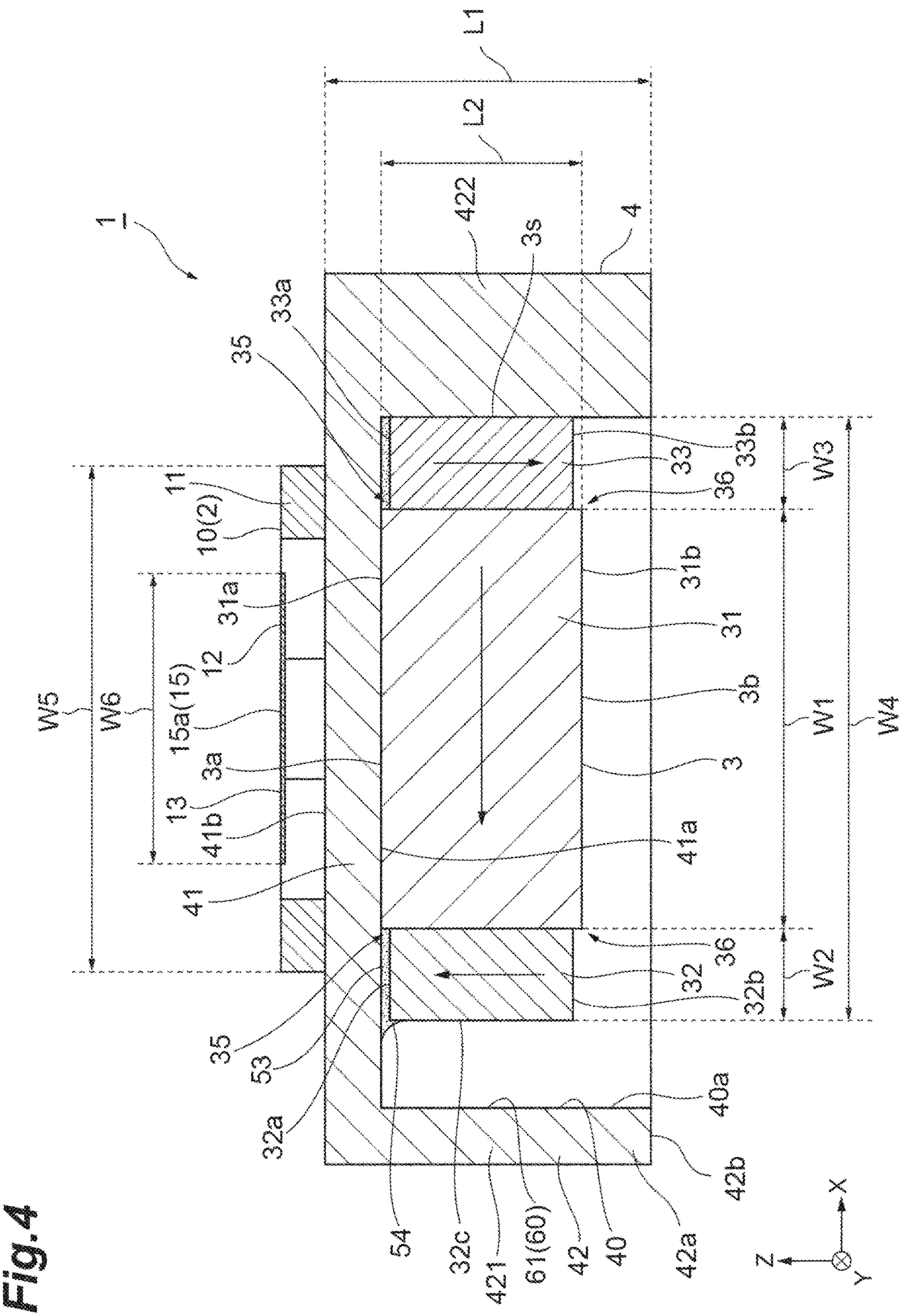
FIG. 4 is a cross-sectional view along line IV-IV of FIG. 1.

As shown in FIGS. 3 and 4, a fillet 54 (first fillet) is formed at a boundary portion between a side surface 32*c* of the second magnet 32 (side surface of the magnet unit 3) and the first surface 41*a* by the adhesive material 53. The fillet 54 is formed by the adhesive material 53 protruding from between the magnet unit 3 and the first surface 41*a* to the outside during the adhesion of the magnet unit 3. For example, the same adhesive material as the adhesive material 51 can be used as the adhesive material 53.

As shown in FIGS. 3 and 4, a width W5 of the mirror device 10 in the X direction is narrower than a width W4 of the magnet unit 3 in the X direction. Similarly, a width of the mirror device 10 in the Y direction is narrower than a width of the magnet unit 3 in the Y direction. The Y direction (third direction) is a direction perpendicular to both the X direction (first direction) and the Z direction (second direction). Further, the mirror device 10 and the magnet unit 3 are disposed such that an outer edge of the mirror device 10 is located inside an outer edge of the magnet unit 3 when viewed in the Z direction. In this example, the width W1 of the first magnet 31 in the X direction is wider than a width W6 of the movable mirror portion 12 in the X direction (FIG. 4). When viewed in the Z direction, an outer edge of the movable mirror portion 12 is located inside an outer edge of the first magnet 31.

The side wall portion 42 is formed in, for example, a rectangular frame shape, and extends perpendicular to the base wall portion 41 along the Z direction. The side wall portion 42 includes a first side wall portion 421, a second side wall portion 422, a third side wall portion 423, and a fourth side wall portion 424. The first side wall portion 421 faces the second side wall portion 422 in the X direction with the magnet unit 3 interposed therebetween, and the third side wall portion 423 faces the fourth side wall portion 424 in the Y direction with the magnet unit 3 interposed therebetween. The third side wall portion 423 and the fourth side wall portion 424 extend to intersect the first side wall portion 421 and the second side wall portion 422 (in this example, perpendicular to the first side wall portion 421 and the second side wall portion 422). Each of the side wall portions 421 to 424 is formed in a rectangular shape. The side wall portions 421 to 424 face the side surface 3*s* of the magnet unit 3, and surround the magnet unit 3 when viewed in the Z direction.

Figure 5:
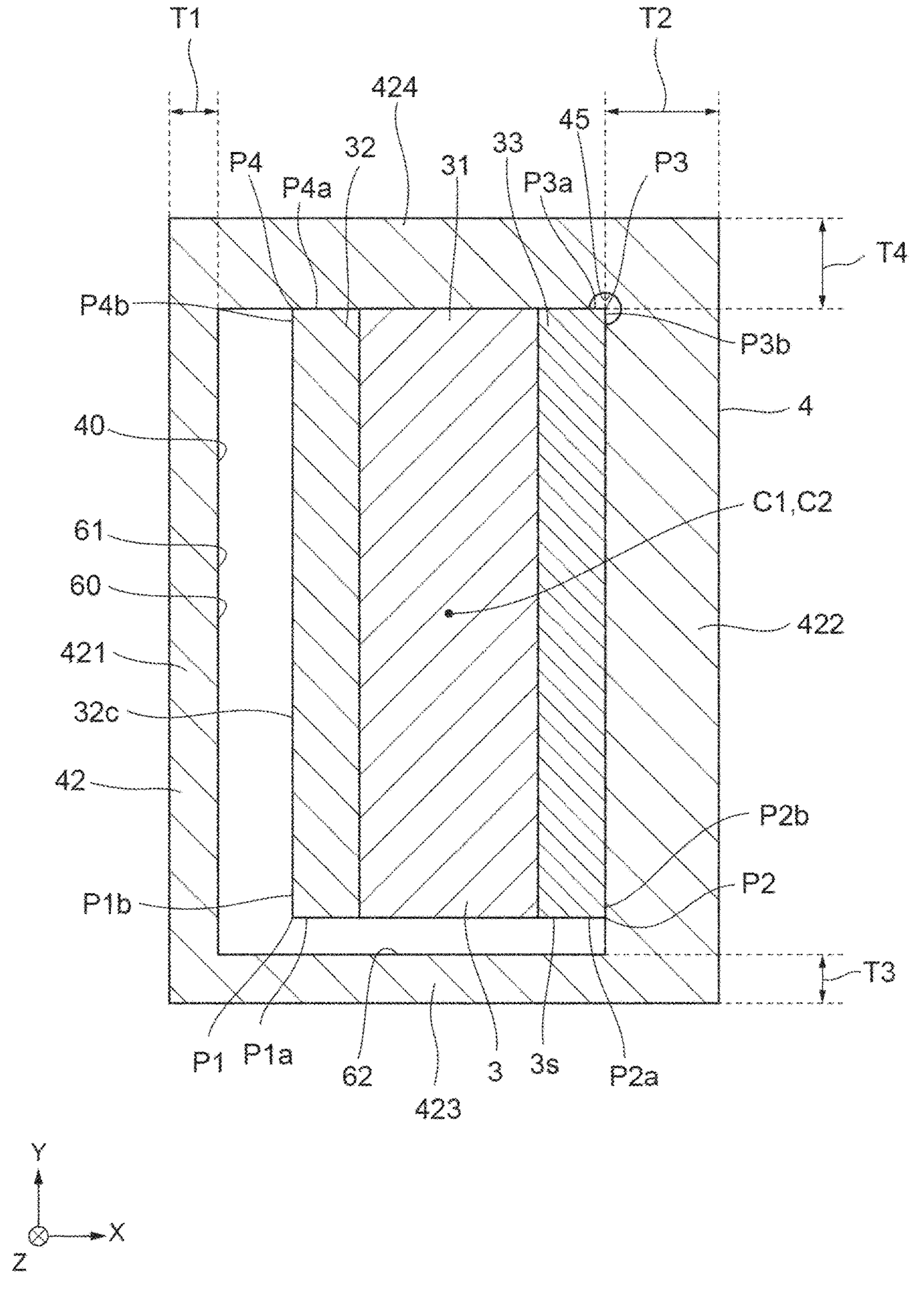
FIG. 5 is a lateral cross-sectional view of the optical module.

As shown in FIG. 5, a thickness T2 of the second side wall portion 422 is thicker than a thickness T1 of the first side wall portion 421, and a thickness T4 of the fourth side wall portion 424 is thicker than a thickness T3 of the third side wall portion 423. In this example, the thickness T2 is equal to the thickness T4, and the thickness T1 is equal to the thickness T3. Regarding the side wall portions 421 to 424, the thicknesses of the side wall portions are thicknesses in directions perpendicular to an extending direction (Z direction) of the side wall portions. In this example, the thicknesses T1 and T2 are thicknesses in the X direction, and the thicknesses T3 and T4 are thicknesses in the Y direction. In this example, the thickness of each of the side wall portions 421 to 424 is constant in the Z direction; however, the thickness of each side wall portion may not be constant in the Z direction (may change). In this case, the thickness of each side wall portion is a thickness at a position where the thickness is at its maximum (maximum thickness).

As shown in FIGS. 3 and 4, an end portion 42*a* on the lower side of the side wall portion 42 delimits an opening portion 40*a* of the recess that is open to the lower side. More specifically, the opening portion is delimited by an inner edge of the end portion 42*a*. In this example, the opening portion 40*a* having a rectangular shape is delimited by the side wall portions 421 to 424. Accordingly, when the magnet unit 3 is fixed to the base wall portion 41, the magnet unit 3 can be disposed into the recess 40 from the opening portion 40*a*. In addition, the optical module 1 has a structure in which the lower side of the magnet unit 3 is open and the bottom surface 3*b* of the magnet unit 3 does not come into contact with the package 4. Namely, when viewed in the Z direction, the side wall portion 42 is located outside the magnet unit 3, and does not overlap the magnet unit 3.

In the optical module 1, the side wall portion 42 protrudes to the lower side with respect to the bottom surface 3*b* of the magnet unit 3. Namely, an end surface 42*b* on the lower side (side opposite to the base wall portion 41) of the side wall portion 42 is located closer to the lower side than the bottom surface 3*b* of the magnet unit 3. In this example, the end surface 42*b* is a flat surface perpendicular to the Z direction. As shown in FIG. 4, in the optical module 1, a length L1 of the side wall portion 42 in the Z direction is longer than a length L2 (maximum length) of the magnet unit 3 in the Z direction, and as a result, the side wall portion 42 protrudes to the lower side with respect to the bottom surface 3*b* of the magnet unit 3. In this example, the length L2 is a distance between the first upper surface 31*a* and the first bottom surface 31*b* of the first magnet 31.

As shown in FIG. 5, in this example, the side surface 3*s* of the magnet unit 3 is in contact with the second side wall portion 422 and the fourth side wall portion 424, and is not in contact with the first side wall portion 421 and the third side wall portion 423 (separated from the first side wall portion 421 and the third side wall portion 423). Accordingly, a gap 60 is formed between the magnet unit 3 and both the first side wall portion 421 and the third side wall portion 423. The gap 60 can be used as a space for the release of the adhesive material 53 protruding from between the magnet unit 3 and the base wall portion 41 when the magnet unit 3 is fixed to the base wall portion 41 by the adhesive material 53. Namely, a part or the entirety of the gap 60 may be filled with the adhesive material 53.

The gap 60 includes a first portion 61 formed between the magnet unit 3 and the first side wall portion 421, and a second portion 62 formed between the magnet unit 3 and the third side wall portion 423. The first portion 61 is a portion extending along the Y direction when viewed in the Z direction, and the second portion 62 is a portion extending along the X direction (direction intersecting an extending direction of the first portion 61) when viewed in the Z direction. In this example, a width of the first portion 61 (width in the X direction) is wider than a width of the second portion 62 (width in the Y direction). The gap 60 is formed in an L shape as a whole when viewed in the Z direction.

In this example, the magnet unit 3 is disposed inside the recess 40 such that a center C1 of the magnet unit 3 coincides with a center C2 of the package 4 when viewed in the Z direction. As described above, the thickness T2 of the second side wall portion 422 is thicker than the thickness T1 of the first side wall portion 421, and the thickness T4 of the fourth side wall portion 424 is thicker than the thickness T3 of the third side wall portion 423. For example, a difference between the thicknesses T2 and T1 is equal to the width of the first portion 61 of the gap 60, and a difference between the thicknesses T4 and T3 is equal to the width of the second portion 62 of the gap 60. Accordingly, while forming the gap 60 between the magnet unit 3 and both the first side wall portion 421 and the third side wall portion 423, it is possible to coincide the center C1 of the magnet unit 3 with the center C2 of the package 4 when viewed in the Z direction.

The magnet unit 3 includes four corners P1, P2, P3, and P4 when viewed in the Z direction. A groove portion 45 extending along the Z direction is formed in the side wall portion 42 at a position corresponding to the corner P3. In this example, the groove portion 45 is formed at a boundary portion between the second side wall portion 422 and the fourth side wall portion 424. The groove portion 45 is formed in, for example, a fan shape with a central angle of 270° in a cross section perpendicular to the Z direction, and extends over the entirety of the side wall portion 42 in the Z direction. Since the groove portion 45 is formed, the corner P3 is not in contact with the side wall portion 42 (separated from the side wall portion 42).

In this example, regarding each of the four corners P1 to P4, at least one of two side portions forming the corner is separated from the side wall portion 42. Namely, regarding the corner P3, as described above, two side portions P3*a* and P3*b* forming the corner P3 are both separated from the side wall portion 42 by forming the groove portion 45. Regarding the corner P1, two side portions P1*a* and P1*b* forming the corner P1 are both separated from the side wall portion 42 (the first side wall portion 421 and the third side wall portion 423) by forming the gap Regarding the corner P2, a side portion P2*a* that is one of two side portions P2*a* and P2*b* forming the corner P2 is separated from the side wall portion 42 (third side wall portion 423) by forming the second portion 62 of the gap 60. Regarding the corner P4, a side portion P4*b* that is one of two side portions P4*a* and P4*b* forming the corner P4 is separated from the side wall portion 42 (first side wall portion 421) by forming the first portion 61 of the gap 60.

Functions and Effects

In the optical module 1, the magnet unit 3 is accommodated in the recess 40 of the package 4, the magnet unit 3 is fixed to the first surface 41*a* of the base wall portion 41 delimiting the recess 40, and the mirror device 10 (mirror unit 2) is disposed on the second surface 41*b* on the opposite side of the base wall portion 41 from the first surface 41*a*. Namely, a mounting surface of the magnet unit 3 and a mounting surface of the mirror device 10 have a front-back relationship in the base wall portion 41. Accordingly, even when the step portions 35 are formed on the upper surface 3*a* of the magnet unit 3, a deviation in the inclination of the mirror device 10 due to the influence of the step portions 35 can be suppressed. In addition, the recess 40 includes the opening portion 40*a* that is delimited by the side wall portion 42 and open to the lower side. Accordingly, the magnet unit 3 can be disposed into the recess 40 from the opening portion 40*a*, and a structure can be realized in which the bottom surface 3*b* of the magnet unit 3 does not come into contact with the package 4. Also with this configuration, a deviation in the inclination of the mirror device 10 due to the influence of the step portions 35 and 36 formed on the magnet unit 3 can be suppressed. Namely, for example, in the case of a structure in which the magnet unit 3 is embedded in the package 4 by insert molding, unevenness occurs on a surface of the package 4 due to the influence of the step portions 35 on the upper surface 3*a* and the step portions 36 on the bottom surface 3*b* of the magnet unit 3, and the unevenness causes a deviation in the inclination of the mirror device 10, which is a concern; however, in the optical module 1, the occurrence of such a situation can be suppressed. Further, the side wall portion 42 delimiting the recess 40 protrudes to the lower side with respect to the bottom surface 3*b* of the magnet unit 3. Accordingly, the magnet unit 3 can be reliably accommodated in the package 4, and damage to the magnet unit 3 and the like can be suppressed. In addition, for example, when the optical module 1 is disposed on an installation surface of a stage, by bringing the side wall portion 42 into contact with the installation surface, instead of the bottom surface 3*b* of the magnet unit 3 on which the step portions 35 can be formed, the optical module 1 can be accurately disposed on the stage. Therefore, according to the optical module 1, reliability can be enhanced.

The upper surface 3*a* of the magnet unit 3 is fixed to the base wall portion 41 by the adhesive material 53, and the gap 60 is formed between the magnet unit 3 and the side wall portion 42. Accordingly, when the magnet unit 3 is fixed to the base wall portion 41 by the adhesive material 53, the adhesive material 53 can be released into the gap 60. For this reason, during the adhesion, the magnet unit 3 can be brought closer to the base wall portion 41, so that the magnet unit 3 can be brought closer to the mirror device 10. In addition, in the first magnet 31, the amount of thermal expansion in the X direction (first direction) that is an arrangement direction (magnetization direction) of the magnetic poles is larger than the amount of thermal expansion in a direction perpendicular to the arrangement direction of the magnetic poles; however, since the gap 60 (first portion 61) is formed between the magnet unit 3 and the side wall portion 42 (first side wall portion 421) facing the magnet unit 3 in the X direction, the occurrence of distortion in the package 4 caused by the thermal expansion of the magnet unit 3 can be suppressed.

When viewed in the Z direction (second direction), the gap 60 includes the first portion 61 extending along one direction (Y direction), and the second portion 62 extending along the direction intersecting (orthogonal to) the extending direction of the first portion 61 (X direction). Accordingly, the operational effect of being able to release the adhesive material 53 described above into the gap 60 is remarkably achieved.

The side wall portion 42 includes the first side wall portion 421 and the second side wall portion 422 facing the first side wall portion 421, the gap 60 includes the first portion 61 formed between the magnet unit 3 and the first side wall portion 421, and the thickness T2 of the second side wall portion 422 is thicker than the thickness T1 of the first side wall portion 421. Accordingly, while forming the gap 60 for the release of the adhesive material 53, the center C1 of the magnet unit 3 can be disposed at a position close to the center C2 of the package 4 when viewed in the Z direction. In addition, the side wall portion 42 includes the third side wall portion 423 extending to intersect the first side wall portion 421, and the fourth side wall portion 424 facing the third side wall portion 423, the gap 60 includes the second portion 62 formed between the magnet unit 3 and the third side wall portion 423, and the thickness T4 of the fourth side wall portion 424 is thicker than the thickness T3 of the third side wall portion 423. Even with this configuration, while forming the gap 60 for the release of the adhesive material 53, the center C1 of the magnet unit 3 can be disposed at a position close to the center C2 of the package 4 when viewed in the Z direction.

At least one of the two side portions (the side portions P1*a* and P1*b*, the side portions P2*a* and P2*b*, the side portions P3*a* and P3*b*, or the side portions P4*a* and P4*b*) forming one corner (the corner P1, P2, P3, or P4) of the magnet unit 3 is separated from the side wall portion 42. Accordingly, damage to the one corner can be suppressed. In addition, in the optical module 1, regarding each of the four corners P1 to P4, at least one of the two side portions forming the corner is separated from the side wall portion 42. Accordingly, damage to the corners P1 to P4 of the magnet unit 3 can be suppressed.

The groove portion 45 extending along the Z direction is formed in the side wall portion 42 at the position corresponding to the corner P3 of the magnet unit 3. Accordingly, damage to the corner P3 of the magnet unit 3 can be suppressed, and the positioning of the magnet unit 3 with respect to the side wall portion 42 can be facilitated.

The mirror device 10 is fixed to the second surface 41*b* of the base wall portion 41 by the adhesive material 51, and the fillet 52 is formed at the boundary portion between the side surface 10*a* of the mirror device and the second surface 41*b* of the base wall portion 41 by the adhesive material 51. Accordingly, the mirror device 10 can be firmly fixed to the base wall portion 41.

The thickness of the adhesive material 51 between the mirror device 10 and the second surface 41*b* of the base wall portion 41 is 10 μm to 30 μm. For example, by using the adhesive material 51 with low viscosity, the adhesive material 51 can be formed with such a thickness. By using the adhesive material 51 with low viscosity, a deviation in the inclination of the mirror device 10 can be further suppressed.

The first magnet 31, the second magnet 32, and the third magnet 33 are arranged in a Halbach array. Accordingly, the magnetic flux density in the vicinity of the movable mirror portion 12 can be increased.

The optical module 1 includes the wires 18 for electrically connecting the mirror device 10 with the outside, the mirror device 10 is fixed to the second surface 41*b* of the base wall portion 41 in the predetermined adhesive region R by the adhesive material 51, and the wires 18 are connected to the mirror device 10 at the positions overlapping the adhesive region R when viewed in the Z direction. In this case, damage to the mirror device 10 when the wires 18 are connected can be suppressed. In addition, the wires 18 can be satisfactorily connected to the mirror device 10. Namely, when the wires 18 are connected to the mirror device 10 at positions that do not overlap the adhesive region R, a void exists between the mirror device 10 and the second surface 41*b*, so that it is difficult to connect the wires 18 to the mirror device 10, and the connection strength between the wires 18 and the mirror device 10 decreases, which is a concern. In contrast, in the optical module 1 of the embodiment, since the wires 18 are connected to the mirror device 10 at the positions overlapping the adhesive region R, such a situation can be suppressed, and the wires 18 can be satisfactorily connected to the mirror device 10.

The region where the mirror device 10 is disposed on the second surface 41*b* of the base wall portion 41 is formed flat. Accordingly, for example, compared to when a recess is formed in the region, the strength of the package 4 can be ensured, and the deformation of the package 4 can be suppressed. In addition, since the mirror device 10 is disposed in the flat region, a deviation in the inclination of the mirror device 10 can be further suppressed.

When viewed in the Z direction, the outer edge of the mirror device 10 is located inside the outer edge of the magnet unit 3. Accordingly, a uniform magnetic force can act on the movable mirror portion 12.

The step portions 35 are formed on the upper surface 3*a* of the magnet unit 3 due to the positional differences in the Z direction between the first upper surface 31*a* of the first magnet 31 and both the second upper surface 32*a* of the second magnet 32 and the third upper surface 33*a* of the third magnet 33. In addition, the step portions 36 are formed on the bottom surface 3*b* of the magnet unit 3 due to the positional differences in the Z direction between the first bottom surface 31*b* of the first magnet 31 and both the second bottom surface 32*b* of the second magnet 32 and the third bottom surface 33*b* of the third magnet 33. In this case as well, according to the optical module 1, reliability can be enhanced for the above-described reasons.

Modification Examples

Figure 6:
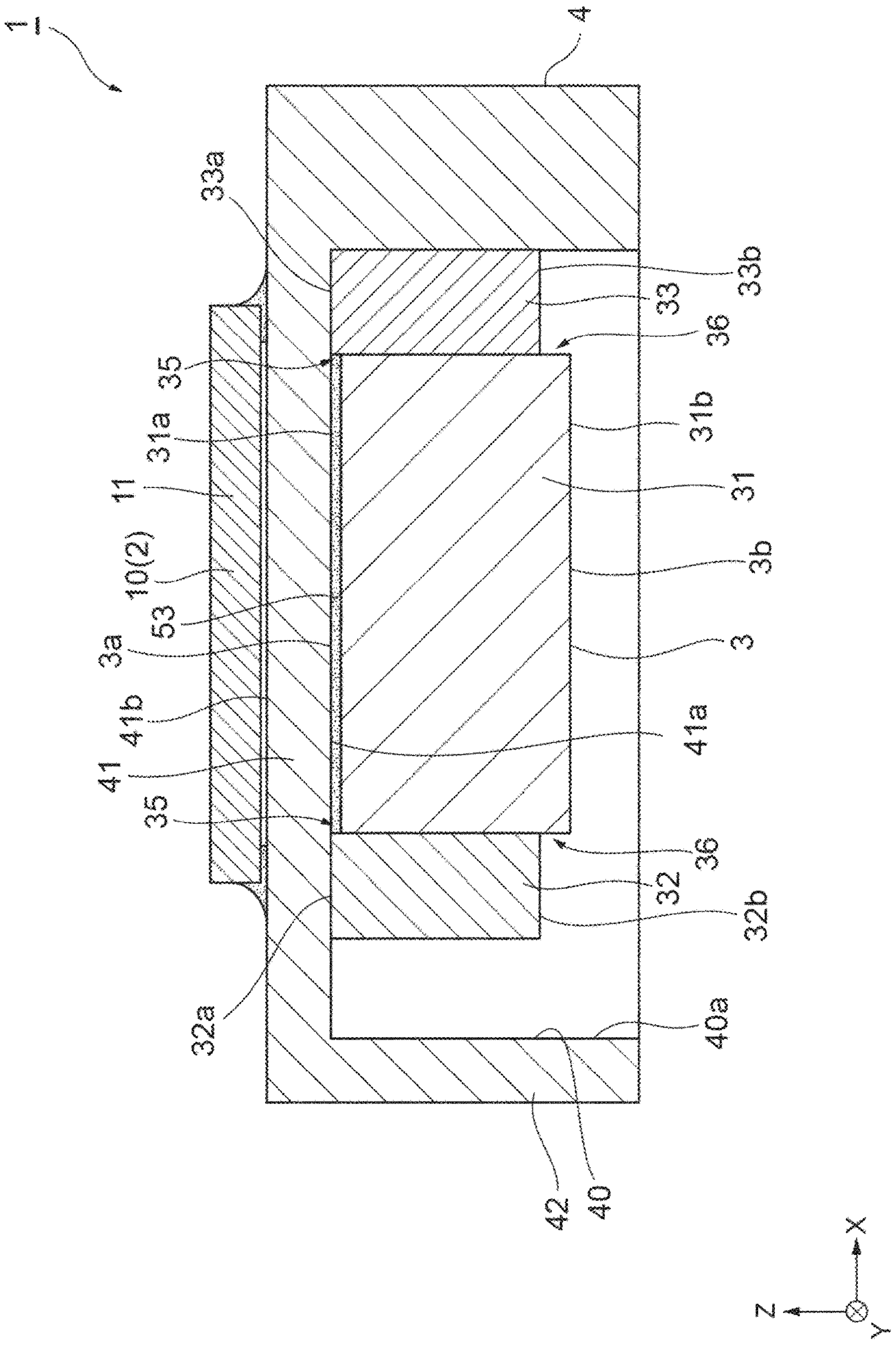
FIG. 6 is a cross-sectional view of an optical module according to a first modification example.

In a first modification example shown in FIG. 6, the first upper surface 31*a* of the first magnet 31 is located closer to the lower side than the second upper surface 32*a* of the second magnet 32 and the third upper surface 33*a* of the third magnet 33. Namely, the second upper surface 32*a* and the third upper surface 33*a* are located closer to the upper side than the first upper surface 31*a*. Accordingly, in the first modification example as well, the step portions 35 are each formed between the first upper surface 31*a* and the second upper surface 32*a* and between the first upper surface 31*a* and the third upper surface 33*a*. In the first modification example as well, similarly to the embodiment, the adhesive material 53 is disposed between the entirety of the upper surface 3*a* of the magnet unit 3 and the first surface 41*a* of the base wall portion 41. Namely, the adhesive material 53 is disposed between the first surface 41*a* and each of the first upper surface 31*a*, the second upper surface 32*a*, and the third upper surface 33*a*. In the first modification example, a gap with a larger thickness in the Z direction is formed between the first upper surface 31*a* and the first surface 41*a* than between the first surface 41*a* and each of the second upper surface 32*a* and the third upper surface 33*a*, and the adhesive material 53 is disposed (filled) in the entirety of the gap. As a result, a larger amount of the adhesive material 53 is disposed between the first upper surface 31*a* and the first surface 41*a* than between the first surface 41*a* and each of the second upper surface 32*a* and the third upper surface 33*a*. In the first modification example as well, similarly to the embodiment, reliability can be enhanced.

Figure 7:
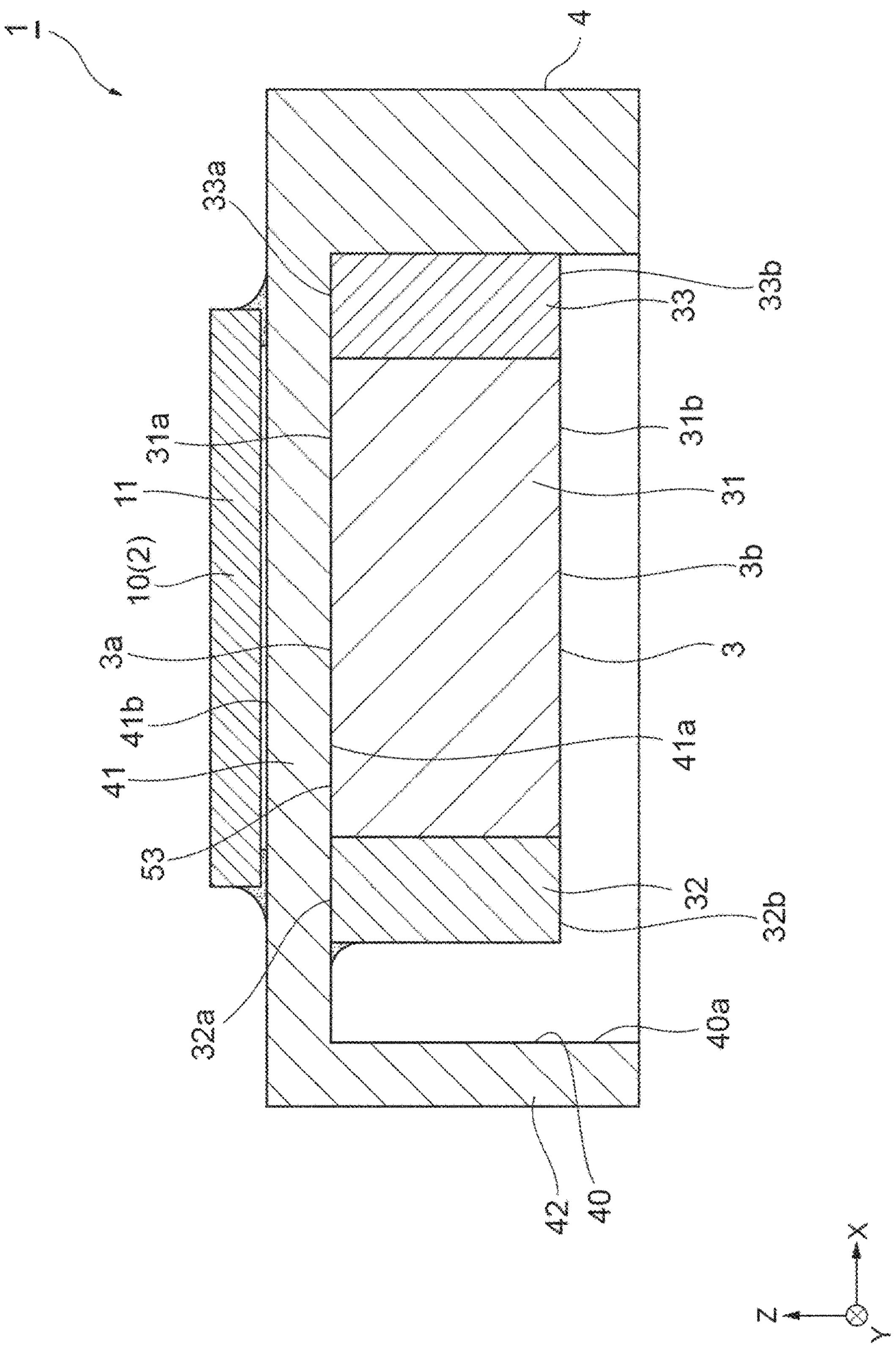
FIG. 7 is a cross-sectional view of an optical module according to a second modification example.

As a second modification example shown in FIG. 7, the first upper surface 31*a* of the first magnet 31, the second upper surface 32*a* of the second magnet 32, and the third upper surface 33*a* of the third magnet 33 may be located on the same plane. In this case, no step portion is formed on both the upper surface 3*a* and the bottom surface 3*b* of the magnet unit 3, and the entireties of the upper surface 3*a* and the bottom surface 3*b* are flat. In the second modification example as well, similarly to the embodiment, the adhesive material 53 is disposed between the entirety of the upper surface 3*a* of the magnet unit 3 and the first surface 41*a* of the base wall portion 41. In the second modification example as well, similarly to the embodiment, reliability can be enhanced.

The present disclosure is not limited to the embodiment and the modification examples. For example, the material and the shape of each configuration are not limited to the material and the shape described above, and various materials and shapes can be adopted. For example, the outer shape of the movable portion 13 is not limited to a rectangular shape, and may be any shape such as a circular shape, an elliptical shape, or a polygonal shape. In the embodiment, the mirror 15 may be configured as a diffraction grating that diffracts and reflects light. In this case, for example, the mirror 15 may be formed along a predetermined diffraction grating pattern.

In the mirror device 10 of the embodiment, the movable portion 13 is configured to be oscillatable around one axis (axis A); however, the movable portion 13 may be configured to be oscillatable around two axes. In this case, for example, the movable portion 13 includes a first movable portion and a second movable portion having a frame shape and surrounding the first movable portion. The mirror 15 is provided on the first movable portion. The second movable portion is connected to the support portion 11 by the pair of connection portions 14 extending along the axis A, and the first movable portion is connected to the second movable portion by another pair of connection portions extending along an axis perpendicular to the axis A. Accordingly, the second movable portion is rotatable around the axis A, and the first movable portion is rotatable around the axis perpendicular to the axis A. As a result, the mirror 15 (first movable portion) is oscillatable around the two axes. In this case, both the first movable portion and the second movable portion may be statically oscillated, or the first movable portion may be oscillated at a resonant frequency level and the second movable portion may be statically oscillated. Alternatively, in the mirror device 10 of the embodiment, the movable mirror portion 12 is oscillatable around the axis; however, the movable mirror portion 12 may be configured to be reciprocatable along the optical axis direction (direction intersecting the mirror 15).

In the embodiment, the mirror unit 2 is formed of only the mirror device 10; however, the mirror unit 2 may further include a base member to which the mirror device 10 is fixed. The base member is, for example, a wiring substrate, and functions as a support member that supports the mirror device 10. In this case, the base member is disposed between the mirror device 10 and the base wall portion 41 of the package 4, and the mirror unit 2 is fixed to the second surface 41*b* of the base wall portion 41 at the base member. When the mirror unit 2 includes the base member, the wires 18 may be connected to the base member. In this case as well, similarly to the embodiment, when a region where the base member is fixed to the second surface 41*b* of the base wall portion 41 by an adhesive material is defined as an adhesive region, the wires 18 may be connected to the base member at positions overlapping the adhesive region when viewed in the Z direction. In this case, damage to the mirror unit 2 (base member) when the wires 18 are connected can be suppressed, and the wires 18 can be satisfactorily connected to the mirror unit 2 (base member).

In the embodiment, the upper surface 3*a* of the magnet unit 3 may be connected to the first surface 41*a* of the base wall portion 41, and an adhesive region between the upper surface 3a and the first surface 41a may be appropriately set. For example, the adhesive material 53 (first adhesive material) may be disposed only between the first upper surface 31a of the first magnet 31 and the first surface 41a, and may not be disposed between the first surface 41a and each of the second upper surface 32a of the second magnet 32 and the third upper surface 33a of the third magnet 33. Alternatively, the adhesive material 53 may be disposed only between the first surface 41a and each of the second upper surface 32a and the third upper surface 33a, and may not be disposed between the first upper surface 31a and the first surface 41a. In the first modification example, the adhesive material 53 may be disposed only between the first upper surface 31a and the first surface 41a, and may not be disposed between the first surface 41a and each of the second upper surface 32a and the third upper surface 33a.

The side surface 3s of the magnet unit 3 may be separated from the side wall portion 42 over the entire circumference. In this case, the gap 60 is formed between the magnet unit 3 and the side wall portion 42 over the entire circumference. In this case, regarding each of the four corners P1 to P4 of the magnet unit 3, the two side portions forming the corner are both separated from the side wall portion 42. In the embodiment, the gap 60 may not include at least one of the first portion 61 and the second portion 62. The gap 60 may not be formed, and the side surface 3s of the magnet unit 3 may be in contact with the side wall portion 42 over the entire circumference. The groove portion 45 may not be formed. One or both of the fillets 52 and 54 may not be formed. The thickness of the adhesive material 51 between the mirror device 10 and the second surface 41b of the base wall portion 41 is not limited to 10 μm to 30 μm. The two side portions forming the corner may be both in contact with the side wall portion 42 at one or all of the four corners P1 to P4 of the magnet unit 3. In the embodiment, the first portion 61 and the second portion 62 of the gap 60 are connected; however, the first portion 61 and the second portion 62 may be separated from each other. For example, the first portion 61 and the second portion 62 may be partitioned off from each other by a protrusion portion protruding from the side wall portion 42, the first magnet 31, the second magnet 32, or the third magnet 33. However, as in the embodiment, when the first portion 61 and the second portion 62 are connected, the adhesive material 53 can be uniformly released.

The width W1 of the first magnet 31 may be narrower than the width W2 of the second magnet 32 and the width W3 of the third magnet 33. Namely, the width W2 of the second magnet 32 and the width W3 of the third magnet 33 may be wider than the width W1 of the first magnet 31. The thicknesses T1 to T4 of the side wall portions 421 to 424 may be equal to each other. In the embodiment, the magnet unit 3 includes the plurality of magnets (the first magnet 31, the second magnet 32, and the third magnet 33) arranged along the X direction (first direction); however, the arrangement direction of the first magnet 31, the second magnet 32, and the third magnet 33 may be any direction, for example, the Y direction. The side wall portion 42 may include a portion extending from the end portion 42a along an X-Y plane (along a direction intersecting the Z direction). The portion is provided not to overlap the magnet unit 3 when viewed in the Z direction (to be located outside the magnet unit 3).

The mirror device 10 may be electrically connected to the outside by means other than the wires 18, and the wires 18 may be omitted. The wires 18 may be connected to the mirror device 10 (electrode pads 17) at positions that do not overlap the adhesive region R when viewed in the Z direction. In other words, the electrode pads 17 may be provided on the mirror device 10 at the positions that do not overlap the adhesive region R when viewed in the Z direction. The region where the mirror device is disposed on the second surface 41b of the base wall portion 41 may not be formed flat, and for example, a protrusion or recess may be formed in the region. When viewed in the Z direction, the outer edge of the mirror device 10 may be located outside the outer edge of the magnet unit 3. When viewed in the Z direction, the outer edge of the movable mirror portion 12 may be located outside the outer edge of the first magnet 31. A method for fixing the mirror unit 2 and the magnet unit 3 to the base wall portion 41 is not limited to adhesion, and may be any method.

In the embodiment, the second direction (Z direction) that is the extending direction of the side wall portion 42 is perpendicular to the first direction (X direction) that is the arrangement direction of the first magnet 31, the second magnet 32, and the third magnet 33; however, the second direction may intersect the first direction and may intersect the first direction at an angle other than the right angle. The step portions may not be formed on the upper surface 3a of the magnet unit 3, and the entirety of the upper surface 3a may be flat. The step portions 36 may not be formed on the bottom surface 3b of the magnet unit 3, and the entirety of the bottom surface 3b may be flat. The second upper surface 32a and the third upper surface 33a may not be located on the same plane. The second bottom surface 32b and the third bottom surface 33b may not be located on the same plane. In the embodiment and the modification examples, the names of the first magnet 31, the second magnet 32, and the third magnet 33 are set for the convenience of description, and the names of the first magnet 31, the second magnet 32, and the third magnet 33 are interchangeable. For example, the first magnet 31 may be regarded as a second magnet, and the second magnet 32 may be regarded as a first magnet. In addition, the order where the first magnet 31, the second magnet 32, and the third magnet 33 are arranged is not limited to the above-described example. The magnet unit 3 may include only two magnets or may include four or more magnets.

What is claimed is:

1. An optical module comprising:

a mirror unit including a mirror device including a support portion and a movable mirror portion provided with a coil and connected to the support portion so as to be oscillatable;

a magnet unit having an upper surface, a bottom surface, and a side surface extending from the upper surface to the bottom surface, and configured to generate a magnetic field acting on the movable mirror portion; and a package including a recess accommodating the magnet unit, wherein the magnet unit includes a plurality of magnets arranged along a first direction, the recess includes a base wall portion which extends along the first direction and to which the upper surface of the magnet unit is fixed, and a side wall portion extending along a second direction intersecting the first direction, and facing the side surface of the magnet unit, when a side on which the magnet unit is located with respect to the base wall portion in the second direction is defined as a lower side, the recess includes an opening portion that is delimited by the side wall portion and open to the lower side, the mirror unit is disposed on a second surface of the base wall portion on an opposite side of the base wall portion from a first surface of the base wall portion to which the magnet unit is fixed, the support portion is disposed on the second surface of the base wall portion, and the side wall portion protrudes to the lower side with respect to a bottom surface of the magnet unit.

2. The optical module according to claim 1, wherein the upper surface of the magnet unit is fixed to the base wall portion by an adhesive material, and a gap is formed between the magnet unit and the side wall portion.

3. The optical module according to claim 2, wherein when viewed in the second direction, the gap includes a first portion extending along one direction, and a second portion extending along a direction intersecting an extending direction of the first portion.

4. The optical module according to claim 2, wherein the side wall portion includes a first side wall portion and a second side wall portion facing the first side wall portion, the gap is formed between the magnet unit and the first side wall portion, and a thickness of the second side wall portion is thicker than a thickness of the first side wall portion.

5. The optical module according to claim 1, wherein the magnet unit includes two side portions forming one corner when viewed in the second direction, and at least one of the two side portions is separated from the side wall portion.

6. The optical module according to claim 1, wherein a groove portion extending along the second direction is formed in the side wall portion at a position corresponding to a corner of the magnet unit.

7. The optical module according to claim 1, wherein the mirror unit is fixed to the second surface of the base wall portion by an adhesive material, and a fillet is formed at a boundary portion between a side surface of the mirror unit and the second surface of the base wall portion by the adhesive material.

8. The optical module according to claim 1, wherein the mirror unit is fixed to the second surface of the base wall portion by an adhesive material, and a thickness of the adhesive material between the mirror unit and the second surface of the base wall portion is 10 μm to 30 μm.

9. The optical module according to claim 1, wherein the plurality of magnets are arranged in a Halbach array.

10. The optical module according to claim 1, further comprising:

a wire for electrically connecting the mirror unit to an outside, wherein the mirror unit is fixed to the second surface of the base wall portion in a predetermined adhesive region by an adhesive material, and the wire is connected to the mirror unit at a position overlapping the adhesive region when viewed in the second direction.

11. The optical module according to claim 1, wherein a region where the mirror unit is disposed on the second surface of the base wall portion is formed flat.

12. The optical module according to claim 1, wherein when viewed in the second direction, an outer edge of the mirror unit is located inside an outer edge of the magnet unit.

13. The optical module according to claim 1, wherein the plurality of magnets include a first magnet and a second magnet, and a step portion is formed on at least one of the upper surface and the bottom surface of the magnet unit due to a positional difference in the second direction between a surface of the first magnet and a surface of the second magnet.

14. The optical module according to claim 1, wherein the plurality of magnets are permanent magnets.

15. The optical module according to claim 1, wherein the upper surface of the magnet unit is fixed to the first surface of the base wall portion by an adhesive material.

16. The optical module according to claim 1, wherein the side wall portion surrounds the magnet unit when viewed in the second direction.

17. The optical module according to claim 1, wherein at least a part of the bottom surface of the magnet unit is not in contact with the package.

18. The optical module according to claim 1, wherein the side wall portion is formed in a frame shape when viewed in the second direction.

19. The optical module according to claim 1, wherein the base wall portion overlaps with both the magnet unit and the mirror unit when viewed in the second direction.

* * * * *